(12) United States Patent
Phillips et al.

(10) Patent No.: US 11,562,192 B2
(45) Date of Patent: Jan. 24, 2023

(54) NANO-CODE-BASED REPORTING AND AUTHENTICATION SYSTEMS

(71) Applicant: MASTERCARD INTERNATIONAL INCORPORATED, Purchase, NY (US)

(72) Inventors: Simon Phillips, York (GB); Alan Johnson, Maldon (GB); Mark Britten, Sevenoaks (GB)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 609 days.

(21) Appl. No.: 16/420,853

(22) Filed: May 23, 2019

(65) Prior Publication Data
US 2020/0372312 A1 Nov. 26, 2020

(51) Int. Cl.
| | | |
|---|---|---|
| *G06Q 30/02* | (2012.01) | |
| *G06Q 20/32* | (2012.01) | |
| *H04W 4/02* | (2018.01) | |
| *G06K 19/06* | (2006.01) | |
| *H04W 12/06* | (2021.01) | |
| *G06K 7/14* | (2006.01) | |
| *G06Q 20/20* | (2012.01) | |
| *H04B 1/3827* | (2015.01) | |
| *H04N 5/225* | (2006.01) | |
| *G02C 11/00* | (2006.01) | |
| *G06K 7/10* | (2006.01) | |

(52) U.S. Cl.
CPC ..... *G06K 19/06084* (2013.01); *G06K 7/1413* (2013.01); *G06K 7/1417* (2013.01); *G06Q 20/202* (2013.01); *G06Q 20/325* (2013.01);
*G06Q 20/3276* (2013.01); *H04B 1/385* (2013.01); *H04N 5/2253* (2013.01); *H04N 5/2254* (2013.01); *H04W 12/06* (2013.01); *G02C 11/10* (2013.01); *G06K 2007/10504* (2013.01); *G06K 2019/06253* (2013.01)

(58) Field of Classification Search
CPC .......... G06K 19/06084; G06K 7/1417; G06K 7/1413; G06K 2007/10504; G06K 2019/06253; G06Q 20/202; G06Q 20/325; G06Q 20/3276; H04B 1/385; H04N 5/2253; H04N 5/2254; H04W 12/06; G02C 11/10
See application file for complete search history.

(56) References Cited

U.S. PATENT DOCUMENTS 9,016,565 B2 * 4/2015 Zhou .................. G06Q 20/3274
235/462.43
10,685,379 B2 * 6/2020 Purves ............... G06Q 20/3224
(Continued)

*Primary Examiner* — Talia F Crawley
(74) *Attorney, Agent, or Firm* — Buckley, Maschoff & Talwalkar LLC

(57) ABSTRACT

A wearable computing device reads near-invisible one- or two-dimensional barcodes having a size of 100 microns to one millimeter. The device includes a magnifying lens, a digital camera, a processor, program memory and a wireless communication module, all supported on a wearable device body. The wearable device body may be an eyeglass frame, a watch body or wristband, a headband or sweatband or a cap or other headgear, among other possibilities. Applications of the wearable computing device include unattended shopping in a physical retail store.

10 Claims, 16 Drawing Sheets

(56) References Cited

U.S. PATENT DOCUMENTS

| | | | |
|---|---|---|---|
| 2011/0282021 A1* | 11/2011 | Joo | B82Y 40/00 |
| | | | 250/311 |
| 2013/0024308 A1* | 1/2013 | Ramaswamy | G07G 1/0081 |
| | | | 705/18 |
| 2013/0146659 A1* | 6/2013 | Zhou | G06Q 20/321 |
| | | | 235/380 |
| 2014/0205083 A1* | 7/2014 | Pryakhin | G06K 1/126 |
| | | | 380/28 |
| 2014/0295903 A1* | 10/2014 | Hatsutori | H04W 8/085 |
| | | | 455/521 |
| 2015/0065171 A1* | 3/2015 | Huilgol | H04W 4/023 |
| | | | 455/456.3 |
| 2016/0162882 A1* | 6/2016 | McClung, III | G06Q 20/352 |
| | | | 705/41 |
| 2016/0207679 A1* | 7/2016 | Jackson | G09F 3/02 |
| 2017/0103379 A1* | 4/2017 | Nelms | G06Q 20/4014 |
| 2018/0075063 A1* | 3/2018 | Patel | G06F 16/9537 |
| 2019/0244248 A1* | 8/2019 | Purves | G06Q 20/40145 |

* cited by examiner

NANO-CODE-BASED REPORTING AND AUTHENTICATION SYSTEMS

BACKGROUND

Advances continue to be proposed in the fields of automation and data acquisition and management.

According to one recent development, an unattended retail store has been established. By "unattended" is meant that there is no checkout counter. Users who carry mobile devices running an appropriate application ("app") enter the store and collect items they wish to purchase. The store is equipped with numerous video cameras and image interpretation computing capabilities. The video cameras and computing capabilities are able to track and identify the user's movements and product items collected by the user and to generate a purchase transaction total accordingly. Payment information (e.g., credit card account) for the user is obtained by the store computing equipment based on communication with the user's mobile device app and/or via a card-on-file arrangement. The store computing equipment then can charge the purchase transaction total to the user's payment card system account.

One drawback with the unattended store as described above is the large number of cameras and/or other sensors required, and the resulting very high cost of constructing the store. It would be desirable to reduce the cost of providing an unattended retail store.

More generally, it would be desirable to improve systems for identification/authentication of individuals, and to improve systems for detecting and/or identifying objects viewed by individuals and/or present in their environment.

BRIEF DESCRIPTION OF THE DRAWINGS

Features and advantages of some embodiments of the present disclosure, and the manner in which the same are accomplished, will become more readily apparent upon consideration of the following detailed description taken in conjunction with the accompanying drawings, which illustrate preferred and example embodiments and which are not necessarily drawn to scale, wherein.

DESCRIPTION

In general, and for the purpose of introducing concepts of embodiments of the present disclosure, environments may be filled with "Nano-codes", which may be detected and read by wearable computing devices worn by individuals traversing the environments. By "Nano-code" is meant a two- or one-dimensional barcode that has a longest dimension in the range of 100 microns to one millimeter. Such barcodes, except in size, may resemble QR (quick response) codes, such as are widely used. The wearable devices include a magnifying lens (or other optics) associated with a digital camera, so that the Nano-codes may be magnified from their barely visible state and data therefrom read by a processor associated with the digital camera. Various applications may make use of the information read from the Nano-codes, including identification of objects that bear the Nano-codes. The wearable devices may be in one or more of a variety of forms, including eyeglasses, watches, wristbands, headbands, sweatbands, headgear such as baseball caps, or configurations not currently or previously produced but described herein. Because of their very small size, and the limits of human visual perception, Nano-codes may be liberally deployed without causing visual clutter.

In one application contemplated herein, the environment may be an unattended retail store, and the Nano-codes may have been applied liberally to product items for sale in the store, including even items of fresh grocery produce. To facilitate application to the latter type of item, the materials used to form and attach the Nano-codes may be edible, at least in some cases. Customers who visit the store wear wearable devices that detect what product items the customers collect for purchase. The wearable devices send product information, and payment information by (e.g.) Wifi or the like to a merchant computer system so that purchases can be submitted by the merchant for payment via payment card account system transactions.

In another application, Nano-codes may be liberally installed in an urban environment and may be detected by a user's wearable device(s) as the user traverses the urban environment. The wearable device(s) may keep a time-stamped record of the Nano-codes (or identifier numbers contained therein) detected as the user moves through the environment, thereby building a historical record of the user's trip/path through the environment in terms of the objects that come within view by the wearable device(s). If the Nano-codes are installed with sufficient density, the time-stamped record may be unique to the user whose wearables detect the Nano-codes, thereby forming a type of identifying or authenticating record for the user.

Figure 1:
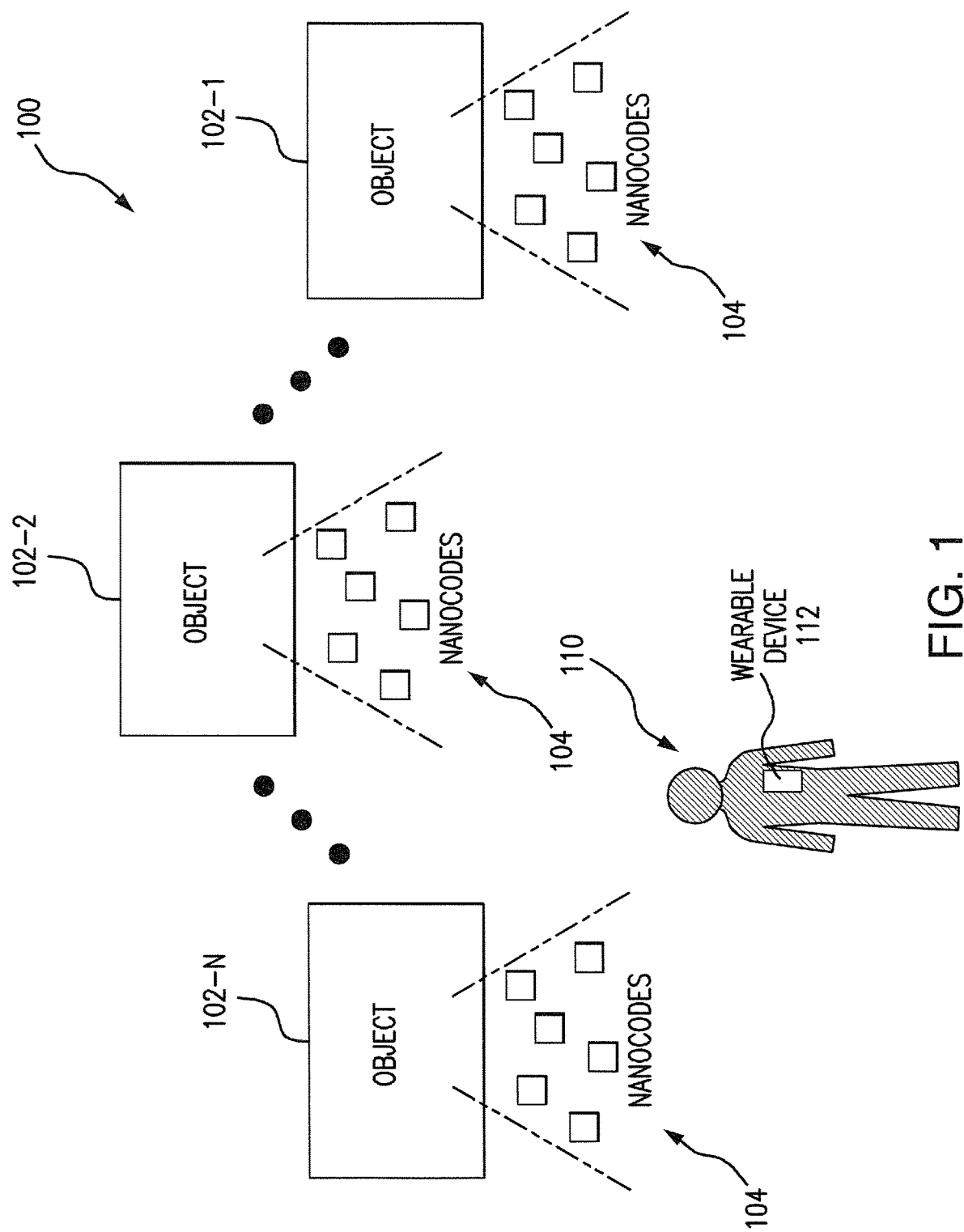
FIG. 1 is a block diagram that schematically illustrates an environment containing objects that are inconspicuously encoded for reading by a user's wearable computing device in accordance with aspects of the present disclosure.

FIG. 1 is a block diagram that schematically illustrates an environment 100, which contains objects 102-1, 102-2, . . . , 102-N. The environment 100 may extend over a large space in three dimensions, and the number of objects 102 may be large, in the thousands, tens of thousands, hundreds of thousands, or more. Some of the objects may be fixed, while others may be movable.

As illustrated schematically, each object 102 may be at least partly covered with Nano-codes 104. Reference is made to the above-stated definition of "Nano-code". For purposes of illustration the Nano-codes 104 are depicted as plainly visible, at least under sufficient magnification. In practice the Nano-codes 104 may be inconspicuous because of their small size or barely visible to unaided human eyesight, and may not be perceptually resolvable as barcodes. In some embodiments, the Nano-codes 104 may be formed (e.g., by printing or stamping) on and/or from heat-shrinkable plastic at larger size than 100 microns to one millimeter, but then may be shrunk to a great extent by heat treatment of the plastic prior to application to the objects 104, thereby rendering the Nano-codes inconspicuous or barely visible to unaided human eyesight while in place on the objects. In some embodiments, after creation and heat-shrinking, the Nano-codes may be suspended in a fluid, which may be painted on an object to attach the Nano-codes to the object. In some embodiments, the Nano-codes are formed and installed such that each object 102 in the environment 100 is uniquely identifiable/detectable by reading an object-specific identification code contained in the Nano-codes applied to the object in question. All Nano-codes applied to a particular object may be substantially identical, or at least may all contain the same object-specific identification code.

FIG. 1 also shows a user/wearer 110 (hereinafter "user"). The user 110 is shown traversing the environment 100 while wearing a (or more than one) wearable computing device 112. Aspects of example embodiments of the wearable computing device 112 will be described below, including the description hereinafter of FIG. 4. In terms of its structural aspects, the wearable computing device 112 may take a number of different forms, as will be discussed below, including with reference to FIGS. 5-8.

A function of the wearable computing device 112 is to read Nano-codes present on objects 102 that the user 110 encounters while traversing the environment 200. The wearable computing device 112 may store and/or transmit data/ object identification codes contained in the Nano-codes that the wearable computing device reads.

As background to further disclosure herein, a conventional payment system 200 will now be described, with reference to FIG. 2.

The system 200 includes a conventional payment card/ device 202. As is familiar to those who are skilled in the art, the payment card/device 202 may be a magnetic stripe card, an IC (integrated circuit) card, a fob, a payment-enabled smartphone, etc. The payment card/device 202 is shown being carried and used by an account holder/user 203.

The system 200 further includes a reader component 204 associated with a POS terminal 206. In some known manner (depending on the type of the payment card/device 202) the reader component 204 is capable of reading the payment account number and other information from the payment card/device 202.

The reader component 204 and the POS terminal 206 may be located at the premises of a retail store and operated by a sales associate (not shown) of the retailer for the purpose of processing retail transactions. The payment card/device 202 is shown in FIG. 2 to be interacting with the reader component 204 and the POS terminal 206 for the purpose of executing such a transaction. As is well-known, the POS terminal 206 may include a barcode reader (not separately shown) by which UPC codes on purchased items are read to identify the purchased items and to obtain price information therefor.

Figure 2:
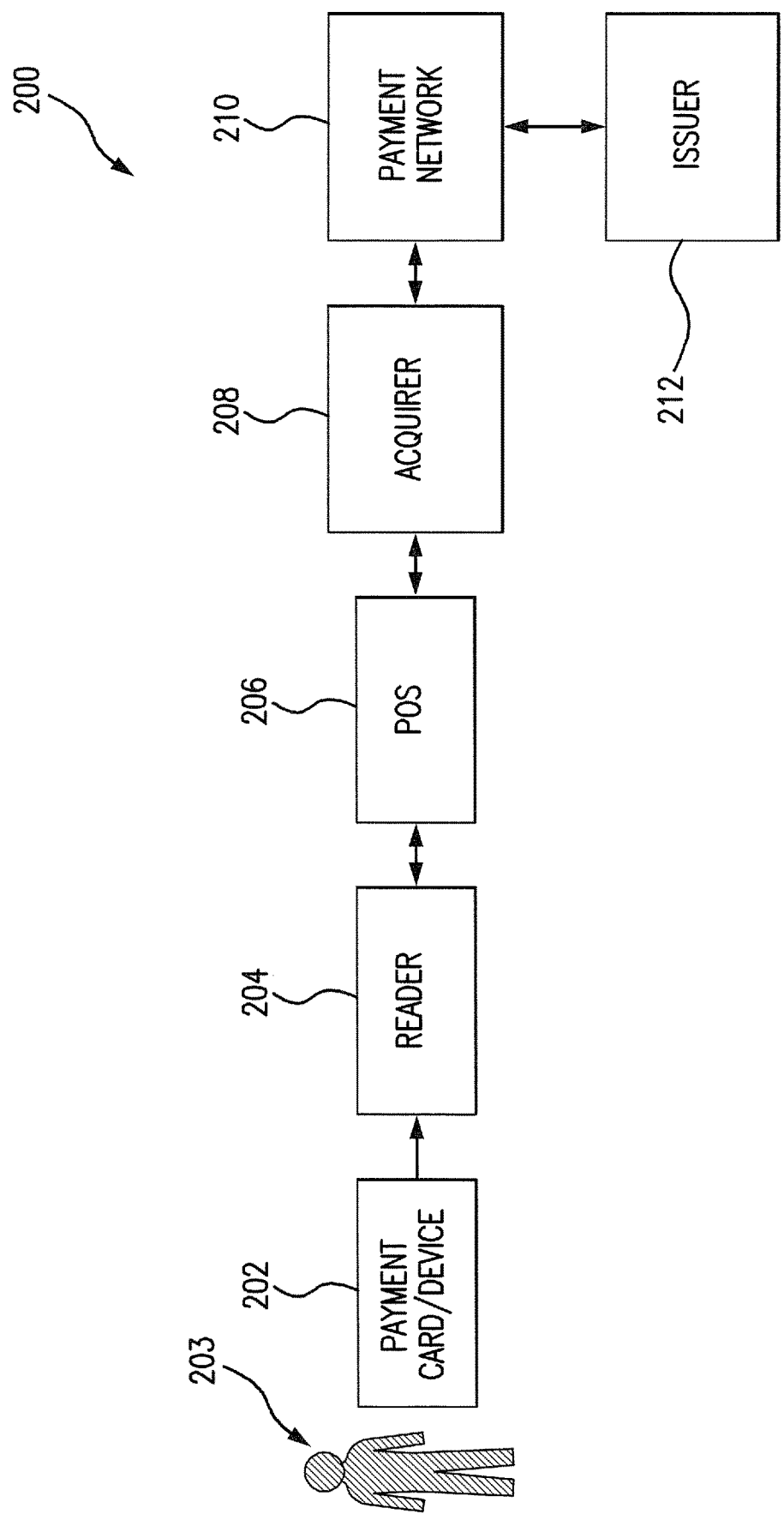
FIG. 2 is a block diagram that illustrates a conventional payment system.

A computer 208 operated by an acquirer (acquiring financial institution) is also shown as part of the system 200 in FIG. 2. The acquirer computer 208 may operate in a conventional manner to receive an authorization request for the transaction from the POS terminal 206. The acquirer computer 208 may route the authorization request via a payment network 210 to the server computer 212 operated by the issuer of a payment account that is associated with the payment card/device 202. As is also well known, the authorization response generated by the payment card issuer server computer 212 may be routed back to the POS terminal 206 via the payment network 210 and the acquirer computer 208.

One well known example of a payment network is the one operated by Mastercard International Incorporated, which is the assignee hereof.

The payment account issuer server computer 212 may be operated by or on behalf of a financial institution ("FI") that issues payment accounts to individual users. For example, the payment account issuer server computer 212 may perform such functions as (a) receiving and responding to requests for authorization of payment account transactions to be charged to payment accounts issued by the FI; (b) tracking and storing transactions and maintaining account records; (c) rendering periodic account statements; and (d) receiving and tracking payments to the issuer from the account holders.

The components of the system 200 as depicted in FIG. 2 are only those that are needed for processing a single transaction. A typical payment system may process many purchase transactions (including simultaneous transactions) and may include a considerable number of payment account issuers and their computers, a considerable number of acquirers and their computers, and numerous merchants and their POS terminals and associated reader components. The system may also include a very large number of payment account holders, who carry payment cards or other devices for initiating payment transactions by presenting an associated payment account number to the reader component of a POS terminal.

Still further, and as is well-known, for e-commerce transactions, an e-commerce server computer (not shown) may function as the POS terminal. The e-commerce server computer may be operated by or on behalf of a merchant and may be accessed by the account holder via a browser program running on (for example) a personal computer (not shown) or a smartphone (not shown apart from payment device 202). To arrange for the payment portion of the e-commerce transaction (after selecting one or more items for purchase in the e-commerce transaction), the account holder may manually enter a payment account number, or authorize a charge from a payment account number held on file by the merchant, or access a digital wallet, etc.

Figure 3:
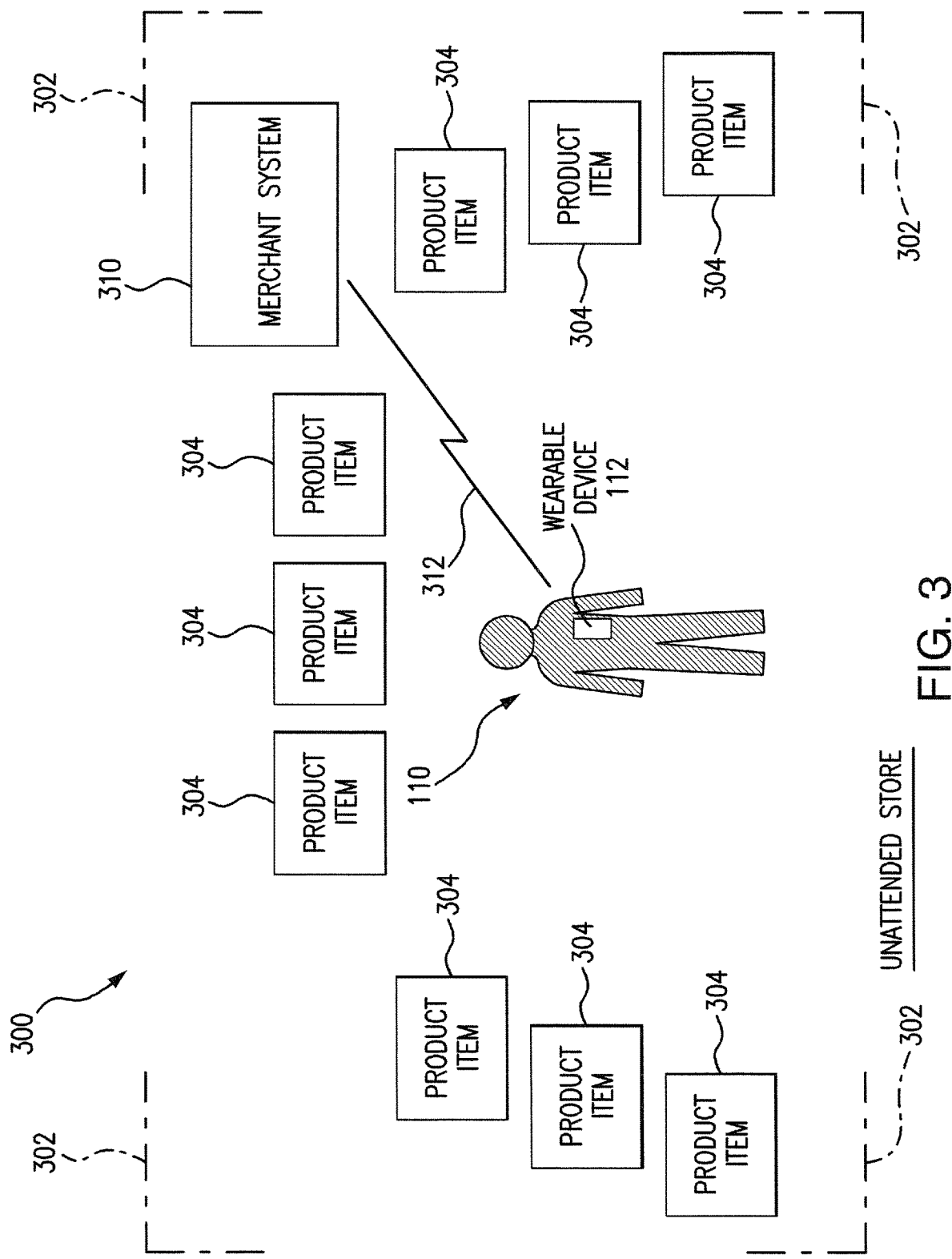
FIG. 3 is a simplified schematic block diagram illustration of an unattended retail store provided according to aspects of the present disclosure.

FIG. 3 is a simplified schematic block diagram illustration of an unattended retail store 300 provided according to aspects of the present disclosure. Corner brackets 302 schematically suggest the physical location of the store 300, including a shopping area which is not separately indicated. The user 110 is shown in the store 300, while wearing the wearable computing device 112. The store 300 may be taken as an example embodiment of the environment 100 depicted in FIG. 1.

Continuing to refer to FIG. 3, the store 300 may be stocked with product items 304 available for purchase by the user 110 and other customers (not shown). The product items 304 may be presented on conventional store shelves, display fixtures, etc. (not shown). While the product items 304 may include numerous mutually different items, it is also typically the case that at least some product items are presented in groups of identical items of the same type.

Although—to simplify the drawing—no schematic representation of Nano-codes is provided in FIG. 3, it should nevertheless be understood that the product items 304 may each have applied thereto a number of identical (for a given item) Nano-codes as described above. The Nano-codes on each product item may include an SKU (stock keeping unit) number that identifies the product for pricing and other purposes. For product items that are identical to each other, all the product items of that type may bear identical Nano-codes; alternatively, for the product items of one type (one SKU), the Nano-codes may all contain the same SKU number, but may also contain other data that differs from item to item, such as data indicative of different lot numbers, sell-by dates, etc.

A merchant computer system 310 may be present in the store. As will be described in more detail below in connection with FIGS. 12 and 13, the wearable computing device 112 may wirelessly communicate (as indicated at 312) with the merchant computer system 310 to implement unattended checkout after the wearable computing device 112 has read the Nano-codes on the product items collected for purchase by the user 110.

Figure 4:
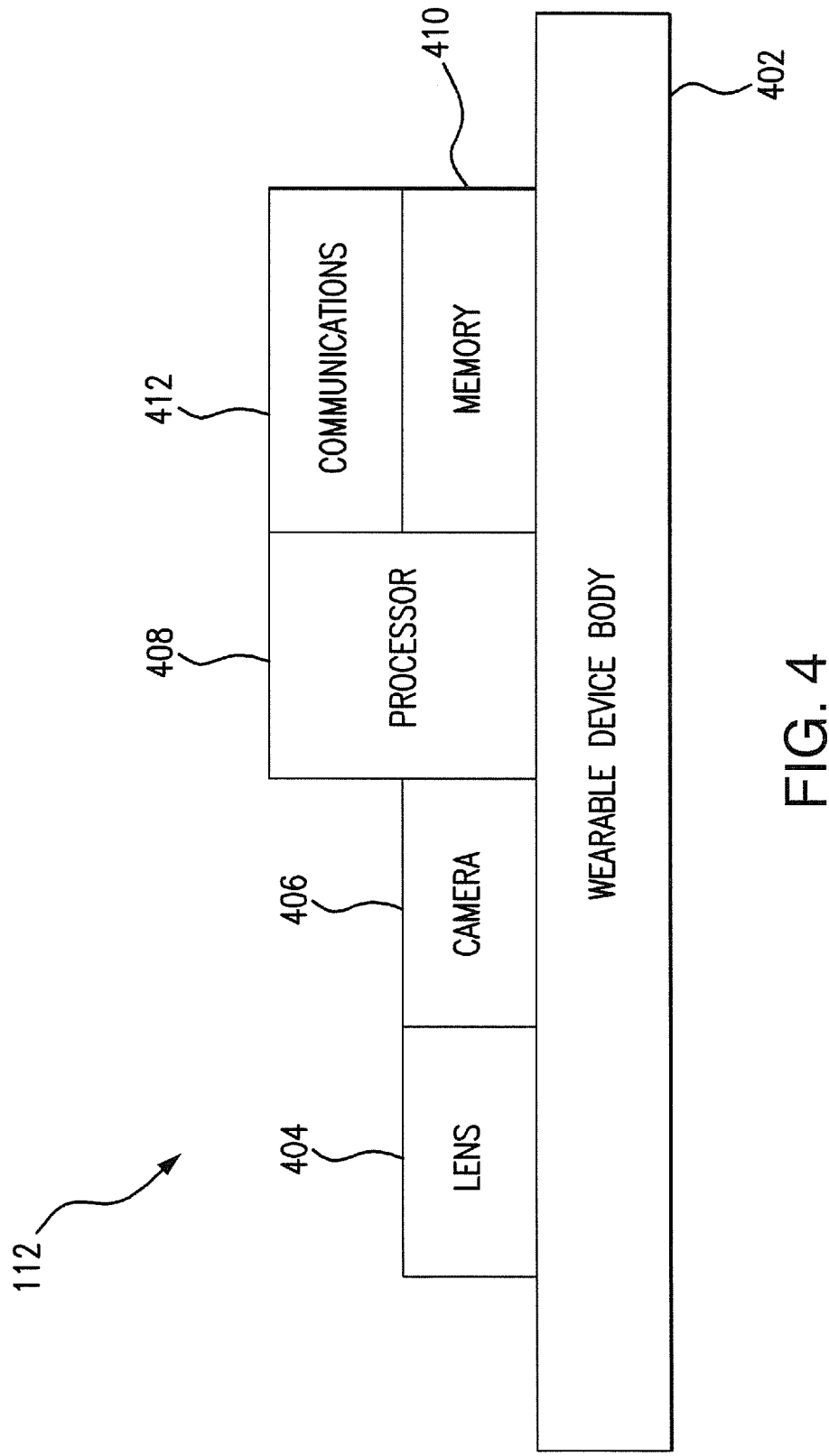
FIG. 4 is a block diagram that illustrates an electronic wearable computing device provided according to aspects of the present disclosure.

FIG. 4 is a block diagram that illustrates an example embodiment of the wearable computing device 112 as seen in FIG. 1 or FIG. 3, and provided according to aspects of the present disclosure.

The wearable computing device 112 includes a wearable device body 402, of which examples will be discussed below. The wearable computing device further includes a magnifying lens 404, which is supported on the wearable device body 402. The magnifying lens 404 performs the function of providing magnified images of Nano-codes that come within view of the wearable computing device 112.

The wearable computing device 112 further includes a digital camera 406, which is also supported on the wearable device body 402. The digital camera 406 is positioned relative to the magnifying lens 404 so as to be situated to capture the magnified images of Nano-codes as provided by the magnifying lens 404.

In addition, the wearable computing device 112 includes a processor 408, which is also supported on the wearable device body 402. The processor 408 may be of a type that controls and performs key functions in mobile devices and/or tablet computers, and may be controlled by software instructions, application programs ("apps"), etc. The processor 408 may be in communication with the digital camera 406 so as to be able to read data contained in Nano-code images captured by the digital camera 406.

Still further, the wearable computing device 112 includes a memory device 410, which is supported on the wearable device body 402. The memory device 410 may be in communication with the processor 408 and may store program instructions for controlling the processor 408, such that the processor and/or the wearable computing device performs functions as described herein.

Moreover, the wearable computing device 112 includes a wireless communication module 412, which is supported on the wearable device body 402. The wireless communication module 412 may be in communication with and/or controlled by the processor 408, and may function to enable the wearable computing device 112 to be in wireless data communication with other devices. The wireless communication module 412 may operate in accordance with Wifi and/or one or more other suitable wireless data communication standards.

Although not shown in the drawing, the wearable computing device 112 may also include a suitable rechargeable battery for supplying power to the electronic components of the wearable computing device 112. In some embodiments, the rechargeable battery may be of a type that is rechargeable in contactless fashion when the wearable computing device body 402 is placed on a recharging pad (not shown).

In some embodiments, the wearable computing device 112 may feature suitable image capture software and/or electronics that compensates for vibration/movement of the device as it reads Nano-codes. The digital camera 406 may feature very fast image capture. The lens/optical system may support a long-range field of vision for the device.

Various embodiments of the wearable device body 402 will now be discussed.

Figure 5:
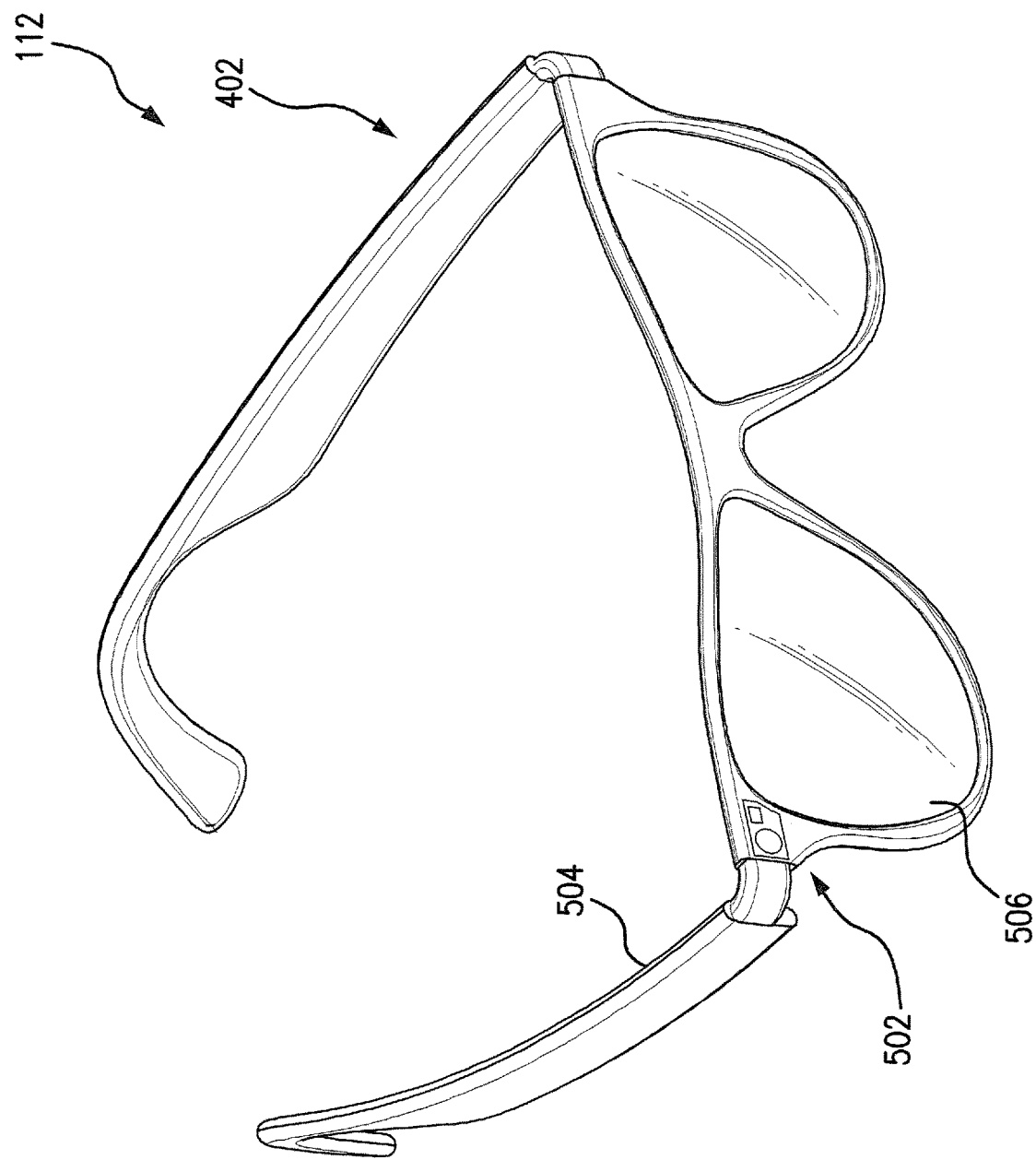
FIG. 5 is a perspective view of an embodiment of the wearable device of FIG. 4, realized as an eyeglass frame.

FIG. 5 is a perspective view of an embodiment of the wearable computing device 112, with the wearable device body 402 realized as an eyeglass frame. Other components of the wearable computing device 112, as depicted in FIG. 4, may be housed in a device module 502 installed at the right hand temple piece 504, right hand eyeglass lens 506, as seen in FIG. 5. The magnifying lens as shown in FIG. 4 is not shown in FIG. 5 apart from the device module 502, but may be positioned to track the point of view of the wearer of the eyeglass frame/wearable device body 112. With this arrangement, the wearable computing device 112, by reading Nano-codes from objects seen by the wearer, may keep a record of such objects and/or may communicate—to other devices or individuals—indications of the identities/types of the objects seen by the wearer.

Figure 6:
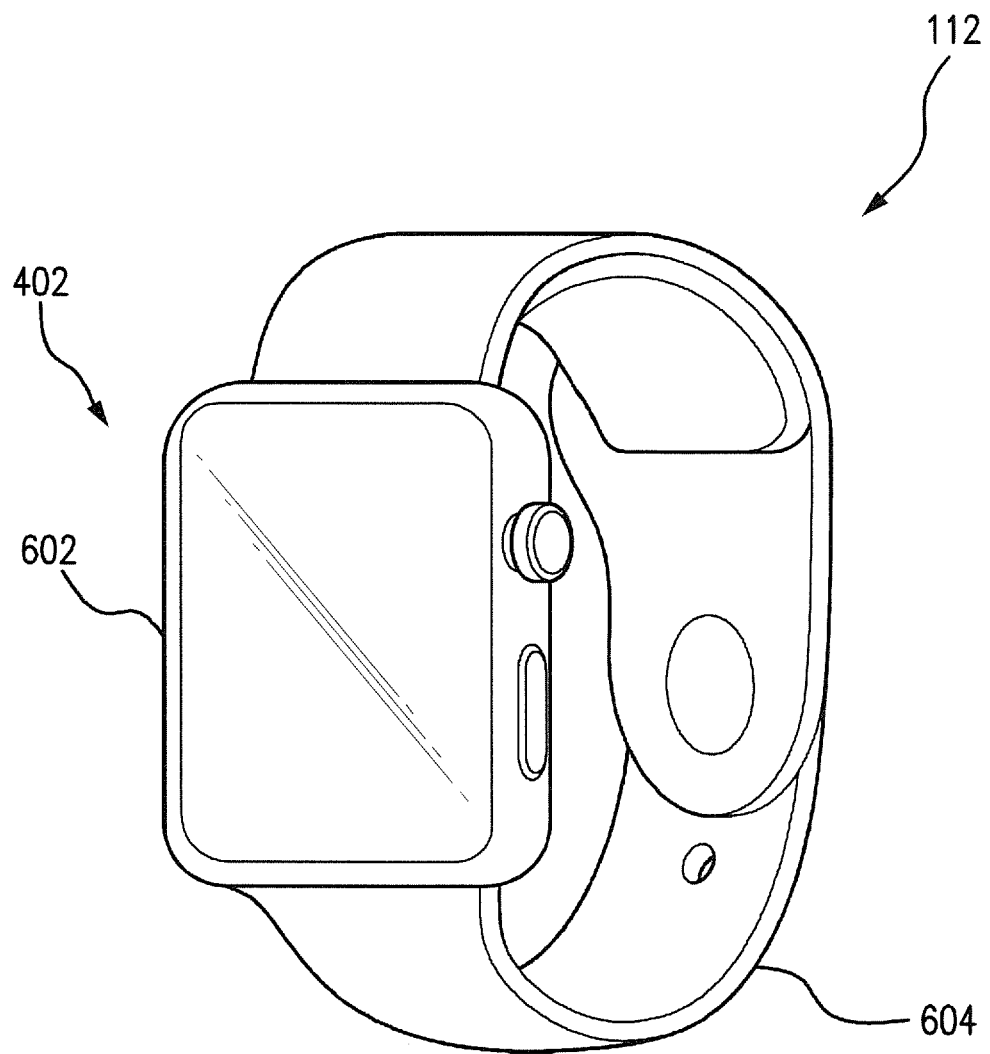
FIG. 6 is a perspective view of an embodiment of the wearable device of FIG. 4, realized as a smartwatch.

FIG. 6 is a perspective view of an embodiment of the wearable computing device 112, with the wearable device body 402 realized as a smartwatch. The wearable device body includes a watch case 602, securable by a wristband/watch band 604 to a wearer's wrist (not shown). The components of the wearable computing device 112 apart from the wearable device body 402 may be supported in or on the watch case 602.

In some arrangements, a user may wear a wearable computing device/smartwatch/wristband 112 (with components as described above in connection with FIG. 4) on both wrists, such that the user is wearing two wearable computing devices 112, with data communication occurring between the two devices. One of the two devices may serve as a master device in terms of handling communications with other devices apart from the two smartwatch/wristband wearable devices.

Figure 7:
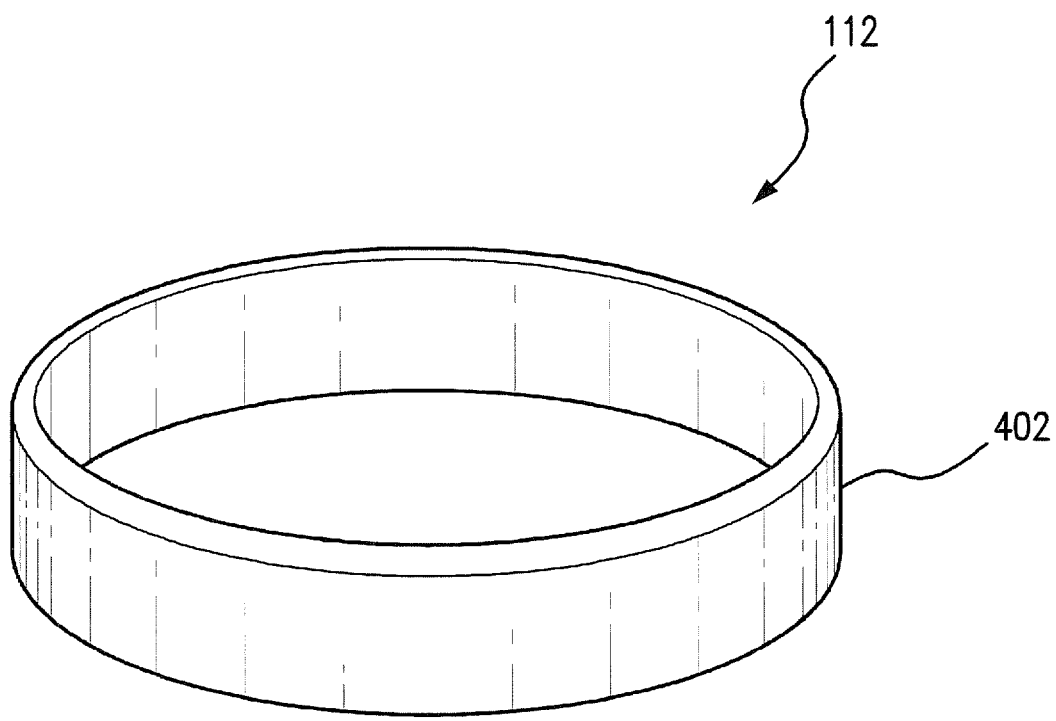
FIG. 7 is a perspective view of an embodiment of the wearable device of FIG. 4, realized as a headband/sweatband.

FIG. 7 is a perspective view of an embodiment of the wearable computing device 112, with the wearable device body 402 realized as a headband/sweatband. As is familiar, the headband/sweatband may be worn encircling the wearer's head (not shown) in a generally horizontal orientation (e.g., horizontally crossing the wearer's forehead). The other components of the wearable computing device 112 are not shown in FIG. 7, in order to simplify the drawing, but may be assumed to be mounted in suitable fashion on and/or around the wearable device body/headband/sweatband 402.

In some embodiments, multiple (e.g., six or more) lens and camera installations (not shown in FIG. 7) may be provided around the sweatband such that the wearable computing device 112 provides virtually a 360° field of view for reading Nano-codes in the wearer's environment by the wearable computing device 112.

Figure 8:
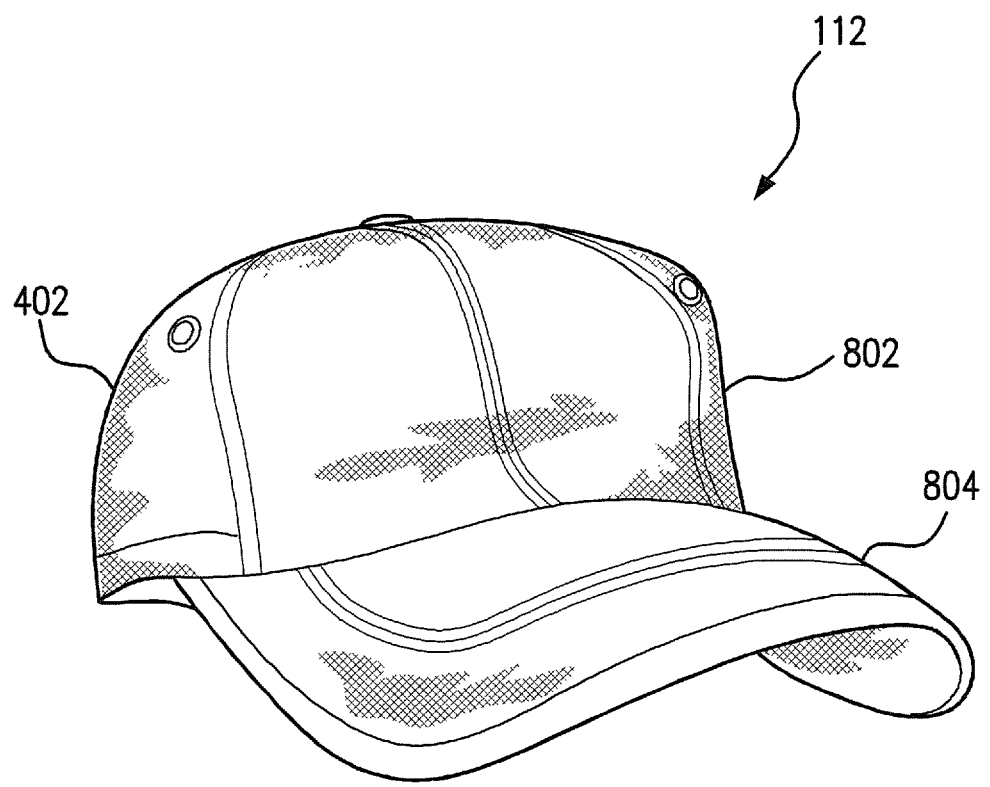
FIG. 8 is a perspective view of an embodiment of the wearable device of FIG. 4, realized as a baseball cap.

FIG. 8 is a perspective view of an embodiment of the wearable computing device 112, with the wearable device body 402 realized as a baseball cap. The other components of the wearable computing device 112 are not shown in FIG. 8, in order to simplify the drawing, but may be assumed to be mounted in suitable fashion on the crown 802 and/or bill 804 of the wearable device body/baseball cap 402. In some embodiments, multiple (e.g., six or more) lens and camera installations (not shown in FIG. 8) may be provided around the circumference of the crown 802 such that the wearable computing device 112 provides virtually a 360° field of view for reading Nano-codes in the wearer's environment by the wearable computing device 112.

Wearable computing devices for wearing on a user's head may take other forms besides those shown in FIGS. 5, 7 and 8. For example, a cap or helmet or the like may be topped with a horizontally-oriented disk of plastic or other material, with the disk performing the role ascribed to the wearable device body 402 in FIG. 4. Such a wearable device body may readily accommodate placement of multiple lens/camera pairs to acquire a 360° field of view as discussed above.

Figure 9:
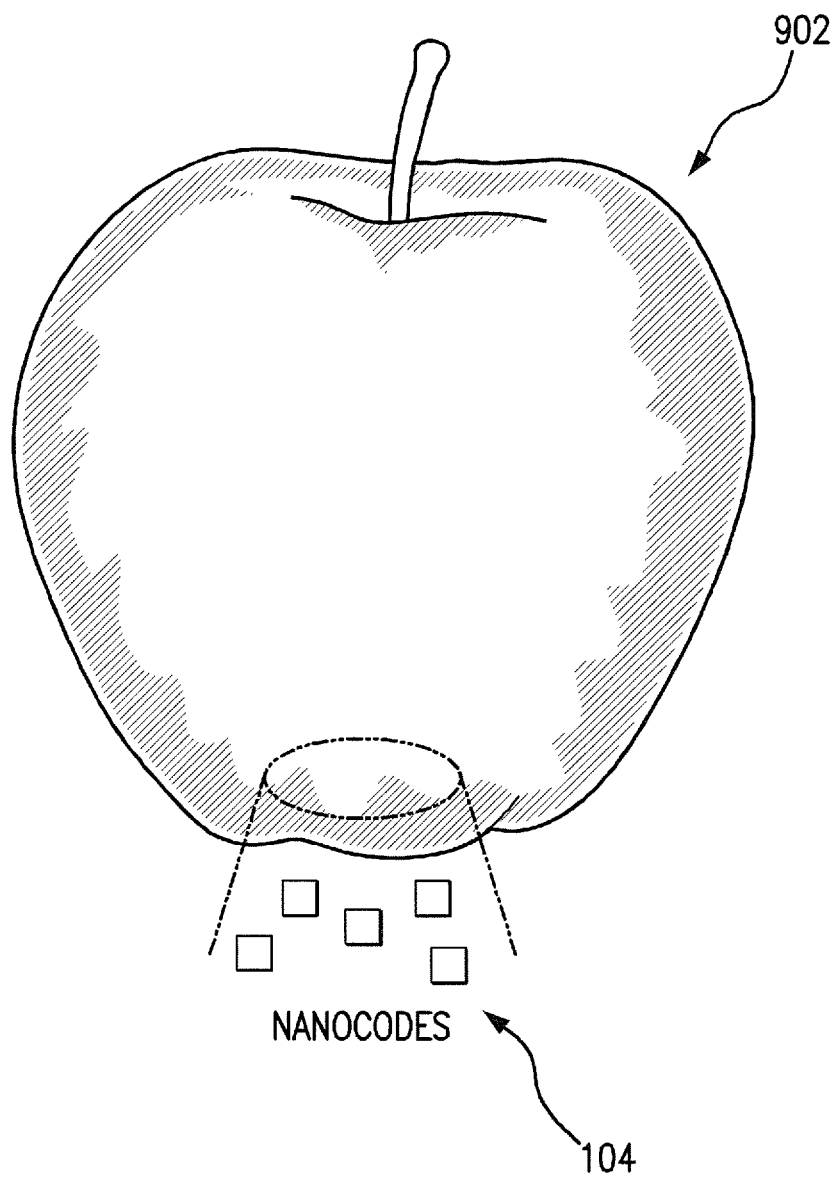
FIG. 9 is a somewhat schematic perspective view of an example item of fresh grocery produce marked inconspicuously with machine readable codes according to aspects of the present disclosure.

FIG. 9 is a somewhat schematic perspective view of an example item 902 of fresh grocery produce (in this example, an apple) marked inconspicuously with Nano-codes 104 according to aspects of the present disclosure. In some embodiments, a considerable number of Nano-codes 104 may be applied to the apple 902, with each the Nano-codes 104 containing a suitable SKU/fresh produce code to allow the apple to be identified as such based on reading of (e.g., one of) the Nano-codes 104. It may be desirable for the Nano-codes 104 to be formed of an edible material, such as an edible (but taste-free) plastic. The apple 902 may be a typical one of the product items 304 shown in FIG. 3. Others of the product items 304 may be packaged goods (also bearing Nano-codes) and/or other types of fresh produce items.

Figure 10:
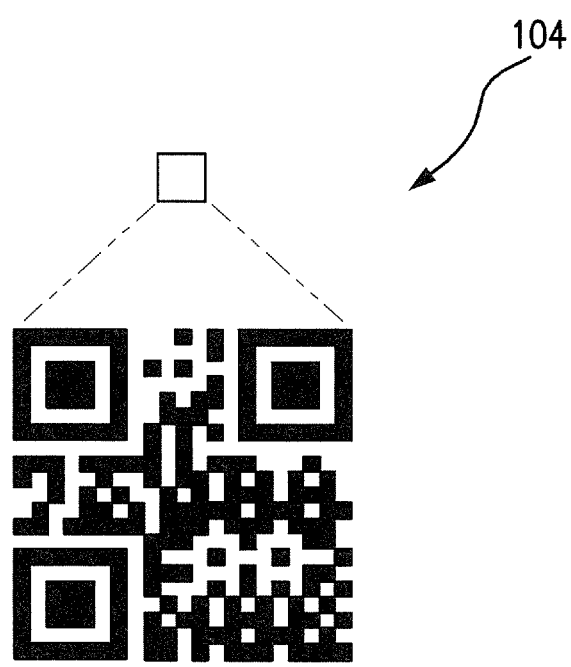
FIG. 10 is a highly magnified view of an example machine-readable code as depicted in FIGS. 1 and 9.

FIG. 10 is a highly magnified view of an example Nano-code 104 as depicted in FIGS. 1 and 9. In this example embodiment, when sufficiently magnified, the Nano-code 104 may resemble a QR code.

Figure 11:
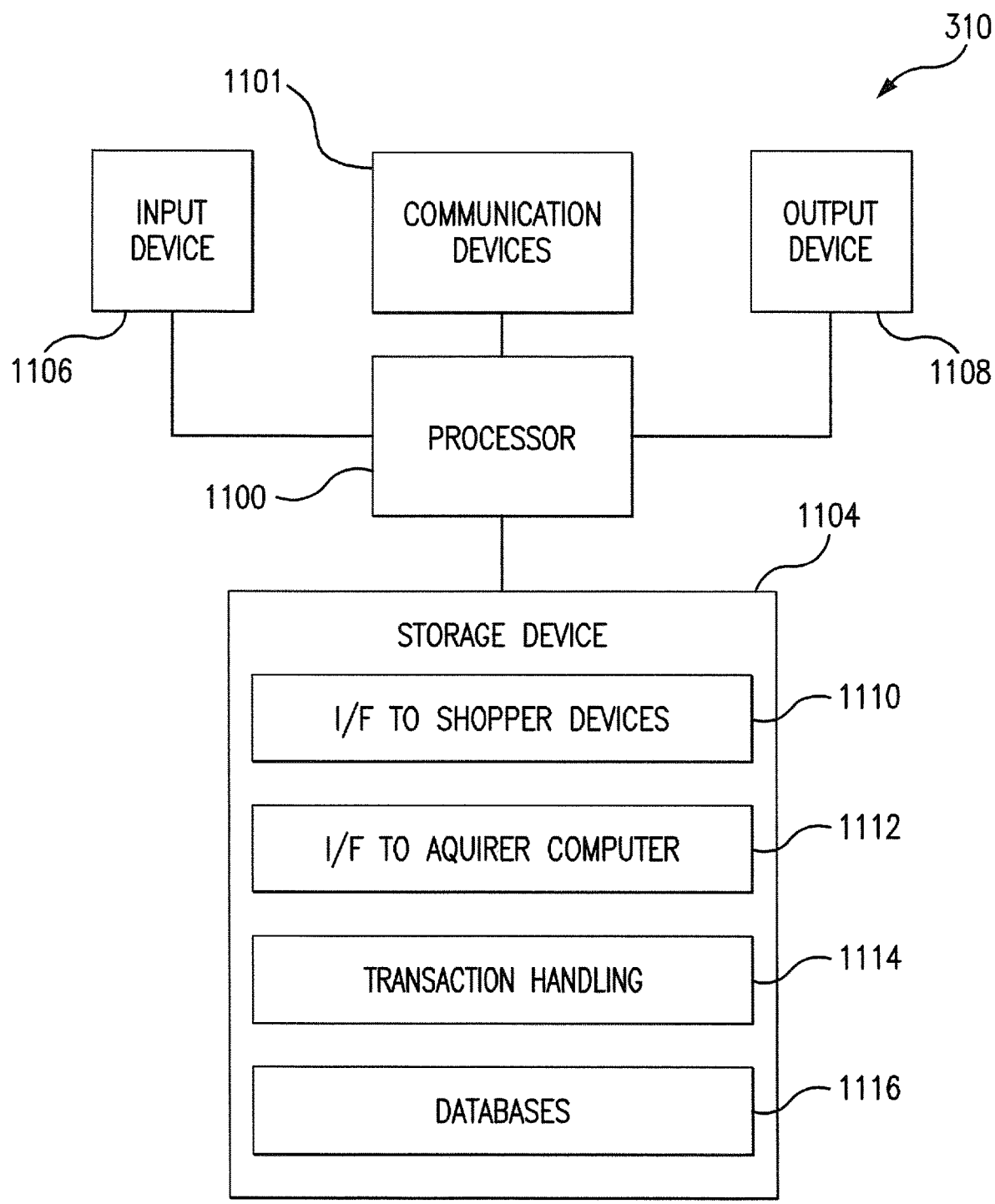
FIG. 11 is a block diagram illustration of an example merchant computer system that may play a role in the unattended retail store depicted in FIG. 3.

FIG. 11 is a block diagram illustration of an example merchant computer system 310 that may play a role in the unattended retail store 300 depicted in FIG. 3.

Referring now to FIG. 11, the merchant computer system 310 may, in its hardware aspects, and in many respects, resemble a typical desktop or server computer, but may be controlled by software to cause it to function as described herein.

The merchant computer system 310 may include a computer processor 1100 operatively coupled to communication devices 1101, a storage device 1104, an input device 1106 and an output device 1108. The communications device 1101, the storage device 1104, the input device 1106 and the output device 1108 may all be in communication with the processor 1100.

The computer processor 1100 may be constituted by one or more processors. Processor 1100 operates to execute processor-executable steps, contained in program instructions described below, so as to control the merchant computer system 310 to provide desired functionality.

Communication devices 1101 may be used to facilitate communication with, for example, other devices (such as shoppers' wearable computing devices, and a remote computer operated by the merchant's transaction acquirer financial institution (FI)). Communication devices 1101 may comprise numerous communication ports (not separately shown), to allow the merchant computer system 310 to communicate simultaneously with a number of other devices, including communications as required to simultaneously handle numerous interactions with shoppers' wearable devices and with the acquirer FI computer.

Input device 1106 may comprise one or more of any type of peripheral device typically used to input data into a computer. For example, the input device 1106 may include a keyboard and a mouse. Output device 1108 may comprise, for example, a display and/or a printer.

Storage device 1104 may comprise any appropriate information storage device, including combinations of magnetic storage devices (e.g., hard disk drives), optical storage devices such as CDs and/or DVDs, and/or semiconductor memory devices such as Random Access Memory (RAM) devices and Read Only Memory (ROM) devices, as well as so-called flash memory. Any one or more of such information storage devices may be considered to be a computer-readable storage medium or a computer usable medium or a memory.

Storage device 1104 stores one or more programs for controlling processor 1100. The programs comprise program instructions (which may be referred to as computer readable program code means) that contain processor-executable process steps of the merchant computer system 310, executed by the processor 1100 to cause the merchant computer system 310 to function as described herein.

The programs may include one or more conventional operating systems (not shown) that control the processor 1100 so as to manage and coordinate activities and sharing of resources in the merchant computer system 310, and to serve as a host for application programs (described below) that run on the merchant computer system 310.

In addition, the storage device 1104 may store a software interface 1110 that facilitates communication with the shoppers' wearable computing devices. Also, the storage device 1104 may store a software interface 1112 that facilitates communication with the acquirer FI computer.

Still further, the storage device 1104 may store a transaction handling application program 1114. The transaction handling application program 1114 may control the processor 1100 so as to enable the merchant computer system 310 to engage in transaction handling pursuant to requests from shoppers' wearable computing devices and in accordance with aspects of the present disclosure. Details of the operation of the merchant computer system 310 pursuant to the transaction handling application program 1114 will be described below.

The storage device 1104 may also store, and the merchant computer system 310 may also execute, other programs, which are not shown. For example, such programs may include a reporting application, which may respond to requests from system administrators for reports on the activities performed by the merchant computer system 310. The other programs may also include, e.g., device drivers, database management programs, communications software, etc.

The storage device 1104 may also store one or more databases (reference numeral 1116) required for operation of the merchant computer system 310. The databases 1116 may include, for example, a product item database (not separately shown). The product item database may store data entries for translating SKU and/or other product code information into product descriptions and for retrieving the prices of the product items, in response to data read from Nano-codes by shoppers' wearable computing devices and relayed to the merchant computer system 310 by the shoppers' wearable computing devices.

Figure 12:
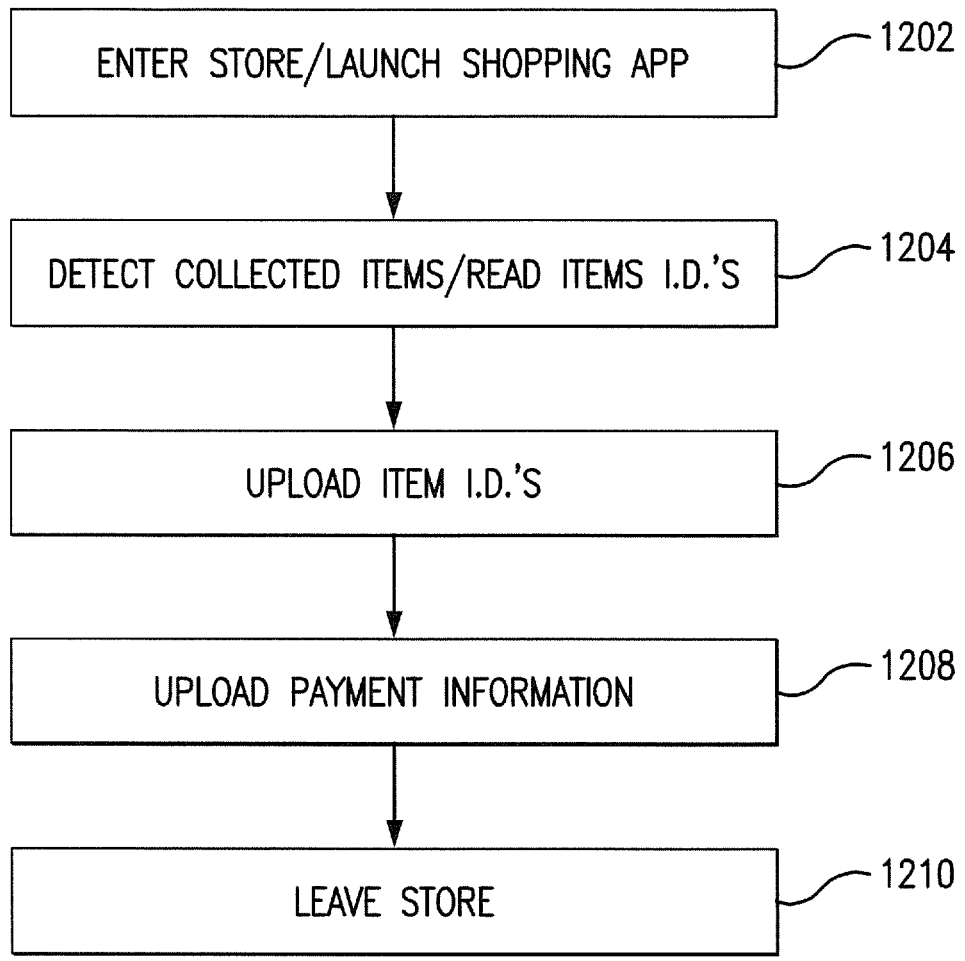
FIGS. 12 and 13 are flow charts that respectively illustrate processes that may be performed in accordance with aspects of the present disclosure in connection with the unattended retail store of FIG. 3.

FIG. 12 is a flow chart that illustrates a process that may be performed in accordance with aspects of the present disclosure in connection with the unattended retail store 300 of FIG. 3. In essence, the process of FIG. 12 reflects a user's shopping visit to the store 300 from the point of view of the user's wearable computing device 112.

At block 1202 in FIG. 12, the user 110 enters the store 300 while wearing the wearable computing device 112 (or more than one such device). As the user 110 enters, the wearable computing device 112 may read one or more Nano-codes (not shown in FIG. 3) that are present on or near the entrance (not shown) to the store 300. (The latter Nano-code(s) is/are indicative of "store entrance" or the like.) The information contained in the Nano-codes at the store entrance, when read by the wearable computing device 112, may cause the wearable computing device to launch a shopping app for controlling the wearable computing device to perform suitable functions, as described herein, for the user's shopping visit to the store 300. The app may control the wearable shopping device 112 to detect when the user collects a product item 302 (FIG. 3)—and does not return the product item 302 to the shelf or display. The app may also control the wearable shopping device 112 to read a Nano-code from the collected item to read an SKU or other product identification from the Nano-code on the collected item. The detection of collected product items and reading of the product item ID's by the wearable computing device 112 is indicated at block 1204 of FIG. 12.

At block 1206, the wearable computing device 112 uploads the product item ID's for the collected product items to the merchant computer system 310.

At block 1208, the wearable computing device 112 uploads payment information (e.g. a payment card account number or payment token taking the place thereof, plus related information) to the merchant computer system 310. This may occur, for example, in response to the wearable computing device 112 reading a Nano-code located on the in-store side of an exit portal (not shown) from the shopping area of the store 300, where the latter Nano-code is indicative of "store exit" or the like. The payment information uploaded at block 1208 may be the same as or akin to the types of payment information provided to the POS terminal 206 from the payment card/device 202 in the conventional payment system/transaction illustrated in FIG. 2.

At block 1210, the user 110 leaves the store 300, with purchased items, and the wearable computing device 112. From the user's point of view, the visit consisted of walking into the store, collecting items desired to be purchased, and walking out, with payment arrangements being handled "behind the scenes", so to speak, and without any conscious involvement by the user during the shopping visit. Also, unlike a previously proposed unattended store arrangement, the user's collection of goods for purchase is detected by the user's own device, brought into the store by the user. Accordingly, there is no need for the installation of item collection detection equipment by the merchant, leading to a great reduction in the cost of constructing and equipping the unattended store based on teachings of the present disclosure.

Figure 13:
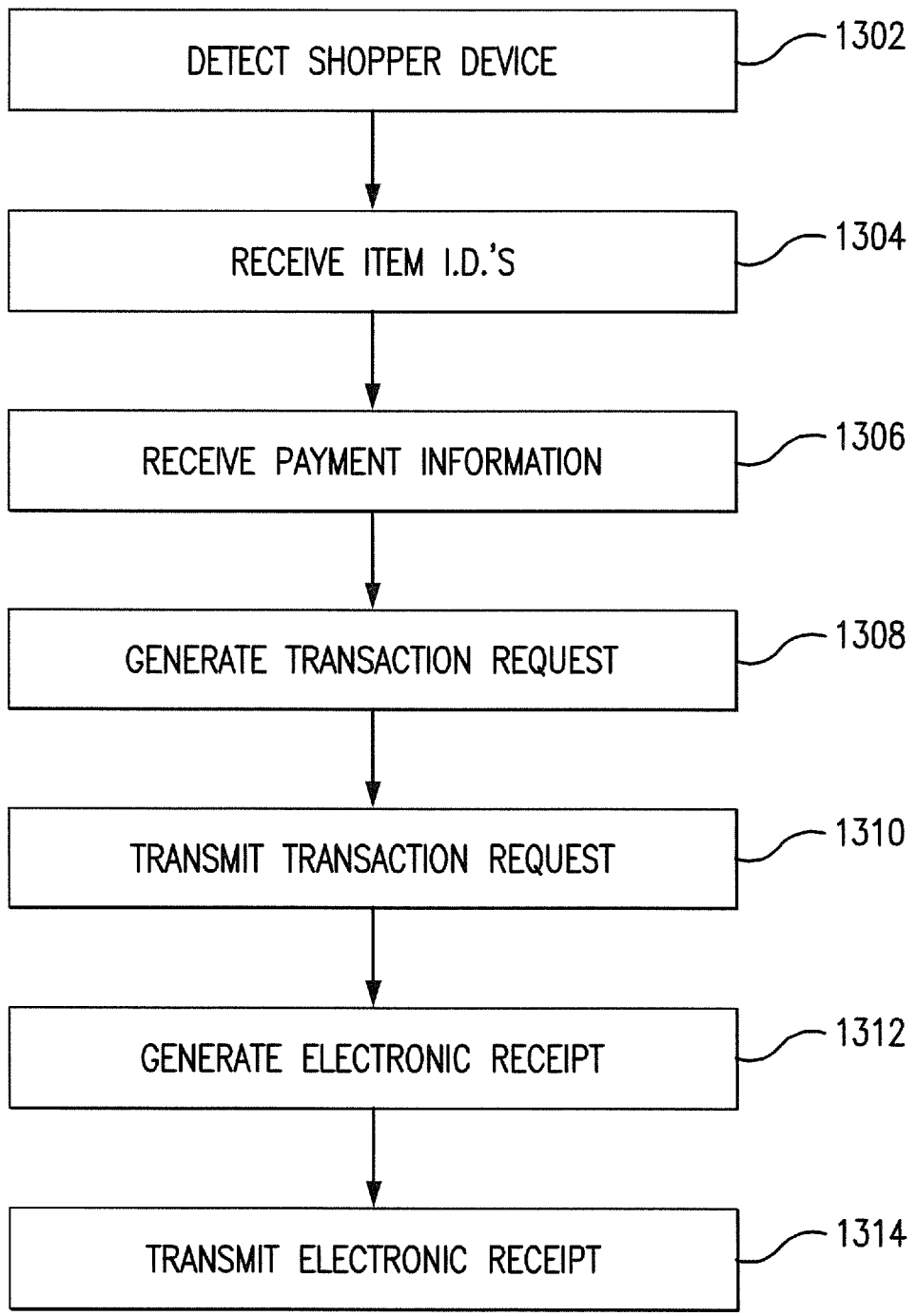

FIG. 13 is a flow chart that illustrates a process that may be performed in accordance with aspects of the present disclosure in connection with the unattended retail store 300 of FIG. 3. In essence, the process of FIG. 12 reflects a user's shopping visit to the store 300 from the point of view of the merchant computer system 310.

At 1302, the merchant computer system 310 receives a signal from the wearable computing device 112 in which the wearable computing device 112 indicates that it has entered the store 300. The wearable computing device 112 may have sent the signal immediately after the launching of the shopping app at 1202 in FIG. 12. Alternatively, the wearable computing device's "I am here" signal may immediately precede or be combined with its uploading of product item identifiers at 1206 in FIG. 12.

Continuing to refer to FIG. 13, block 1304 may follow block 1302. At block 1304, the merchant computer system 310 may receive the product item identifiers uploaded by the wearable computing device 112 at 1206 in FIG. 12.

At block 1306 in FIG. 13, the merchant computer system 310 may receive the payment information uploaded by the wearable computing device at 1208 in FIG. 12. The transmission by the wearable computing device 112 of the payment information may signify that the user is done collecting product items for purchase and is ending the shopping visit; alternatively, the transmission of the payment information may follow or precede a separate signal transmitted from the wearable computing device 112 to the merchant computer system 310 to indicate that the user's shopping visit is concluding.

At a point in time when blocks 1306 and 1304 have occurred, and conclusion of the user's shopping visit has been indicated, the merchant computer system 310 now has all the information typically available to the POS terminal 206 (FIG. 2) in a conventional attended in-store purchase transaction. At this point, as indicated by block 1308, the merchant computer system 310 may proceed to generate an essentially conventional transaction authorization request message, in accordance with the practices involved with a payment card account network. At block 1310, the merchant computer system 310 may transmit the transaction authorization request message to the merchant's acquirer FI/payment processor in a substantially conventional manner. Thus the merchant computer system 310 may function, in effect, as unattended checkout equipment for the merchant.

At 1312, according to some embodiments, the merchant computer system 310 may generate an electronic receipt for the purchase transaction. At 1314, the merchant computer system 310 may transmit the electronic receipt to the user 110, via—for example—the user's mobile phone (not shown) and/or via the user's email address. It is to be understood that the merchant computer system 310 may have the necessary addressing information (for transmitting the electronic receipt) previously on record for the user 110, or may have received the addressing information from the wearable computing device 112, e.g., in conjunction with receiving the payment information at block 1306.

Figure 14:
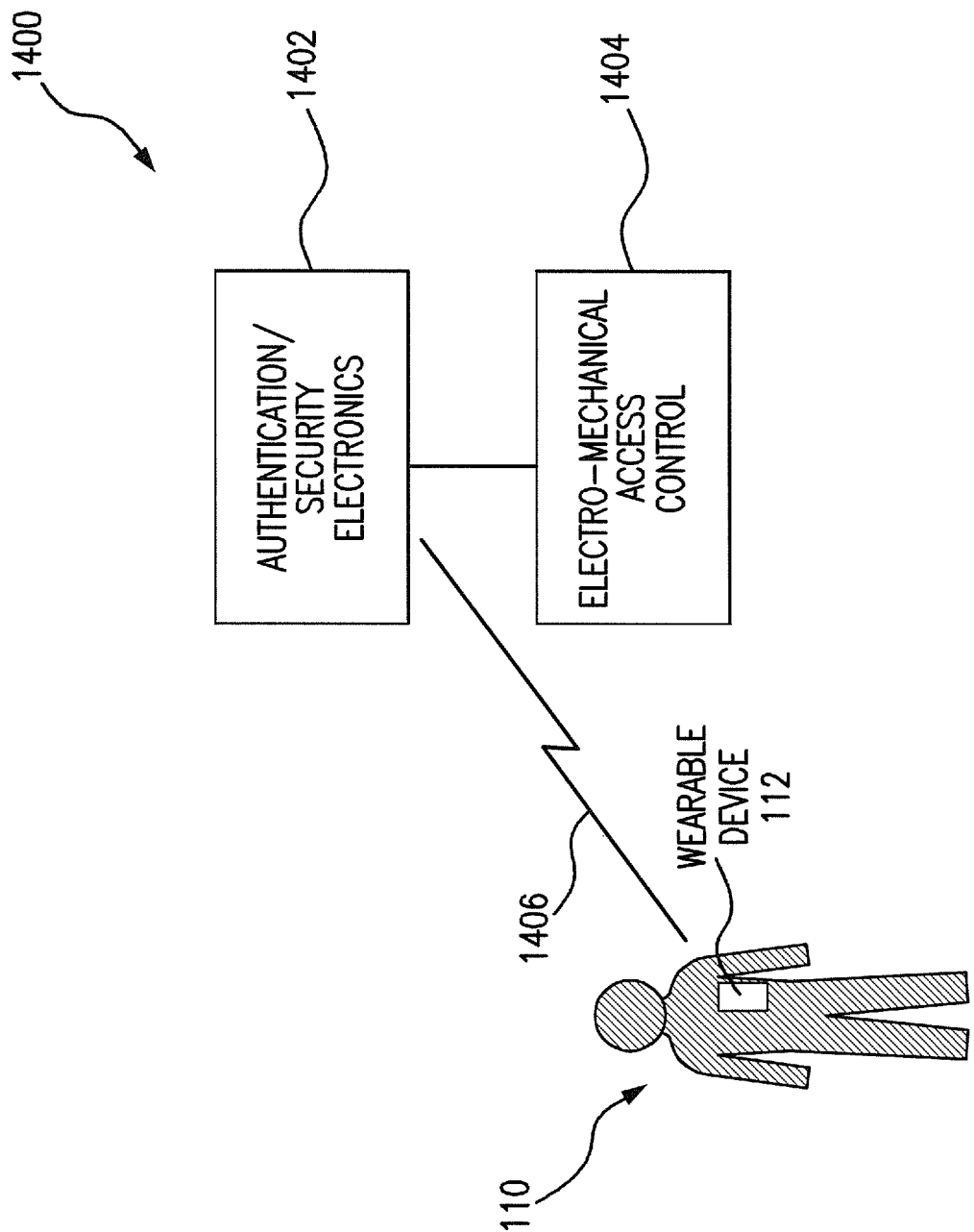
FIG. 14 is a schematic block diagram illustration of an electronic secure-access system provided according to aspects of the present disclosure.

FIG. 14 is a schematic block diagram illustration of an electronic secure-access system 1400 provided according to aspects of the present disclosure.

FIG. 14 shows the user 110, again with a wearable computing device 112. The wearable computing device 112 may take one of the forms discussed above, and may be programmed somewhat differently (or have additional programs) relative to the wearable computing device discussed in connection with FIGS. 3, 12 and 13. In some embodiments, the block 112 may represent two or more wearable devices worn by the user 110. For example, the user 110 may wear two wearable devices, one on each wrist. One of the wristband/watch wearables may be a master to the other, with responsibility for communicating with other devices apart from the wearable devices.

FIG. 14 also shows a user authentication/security electronics module 1402, coupled to an electro-mechanical access control device 1404, the latter possibly embodied as an electronically-controlled lock. The access control device 1404 may lock and selectively unlock a door or gate (neither shown), for example, to control access to a building, room or space (none shown).

The security electronics module 1402 may be similar to an access card reader (and may even include card-reading functionality). However, in its aspects most relevant to this disclosure, the security electronics module 1402 also receives uploads of data from users' wearable computing devices, where the data uploads are interpretable by the security electronics module to authenticate the users/wearers of the wearable computing devices. Accordingly, it is indicated at 1406 that the security electronic module 1402 is in wireless communication with the wearable computing device 112.

The following discussion assumes that the authentication/access transaction is being performed at the user's place of employment. Other examples of access transactions may also be embodied by application of principles described in the present example.

Figure 15:
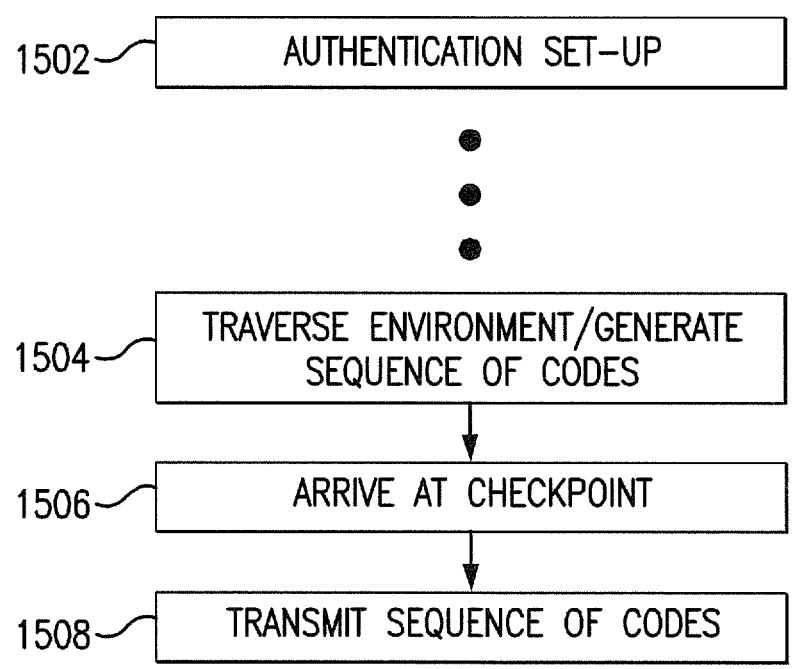
FIGS. 15 and 16 are flow charts that respectively illustrate processes that may be performed in accordance with aspects of the present disclosure in connection with the secure-access system of FIG. 14.

FIG. 15 is a flow chart that illustrates a process that may be performed in accordance with aspects of the present disclosure in connection with the secure-access system of FIG. 14. In particular, the process of FIG. 15 may be taken to represent an access transaction from the point of view of the wearable computing device 112.

Prior to the access transaction, a set-up procedure 1502 (FIG. 15) may take place. The environment 100 of FIG. 1 is relevant. From the point of view of the user 110, the set-up procedure may include traversing the environment 100 from the user's place of residence to the user's place of employment. As the user 110 traverses the environment, the wearable computing device 112 reads Nano-codes 104 present on objects along the user's path through the environment. In some embodiments, the first Nano-code read by the wearable computing device 112 may be one installed at the user's residence. The wearable computing device 112 may add a time-stamp to each Nano-code (or object-identifying code data from the Nano-code) that it reads, and may store a sequence of time-stamped Nano-code data that reflects the path traveled by the user 110 through the environment 100. That is, the sequence of Nano-codes/code data is a record of the user's commute from home to work. This stored sequence of time-stamped Nano-codes/code data may serve as a reference sequence of codes, and may be uploaded from the wearable computing device 112 to the security electronic module 1402 for storage in the security electronic module 1402 as part of the set-up procedure.

To improve security, in some embodiments, Nano-codes may be placed inside the user's home and/or automobile, so that the sequence of codes includes code-records unlikely to be acquired by a would-be impostor.

At 1504 in FIG. 15, e.g., on a later day after block 1502 was performed, the user 110 traverses the environment 100 from home to place of employment, with the wearable computing device reading Nano-codes en route to generate a sequence of time-stamped codes representing objects encountered by the user 110 while commuting. At 1506, at the end of the commute, the user 110 arrives at the location of the security electronic module 1402. At 1508, the wearable computing device 112 uploads the sequence of time-stamped codes (generated at 1504) to the security electronic module 1402.

Figure 16:
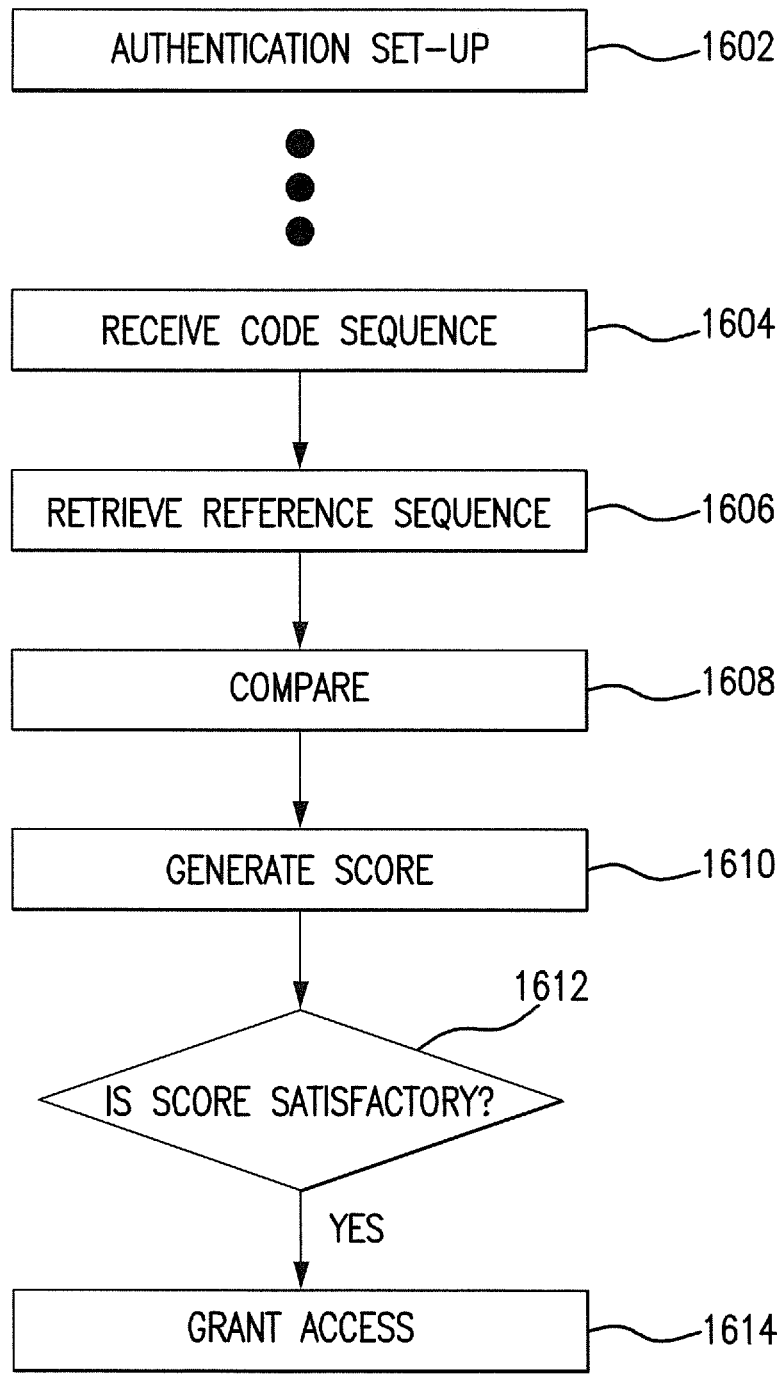

FIG. 16 is a flow chart that illustrates a process that may be performed in accordance with aspects of the present disclosure in connection with the secure-access system of FIG. 14. In particular, the process of FIG. 16 may be taken to represent an access transaction from the point of view of the security electronic module 1402.

Block 1602 in FIG. 16 represents the set up process as discussed above in connection with block 1502 of FIG. 15.

Continuing to refer to FIG. 16, block 1604 occurs, e.g., on a later day; i.e., immediately upon the wearable computing device performing block 1508. At block 1604, the security electronic module 1402 receives the sequence of time-stamped codes uploaded by the wearable computing device at block 1508. At block 1606, the security electronic module 1402 may retrieve the reference sequence of time-stamped codes that was stored in the security electronic module 1402 at blocks 1502/1602. At block 1608, the security electronic module 1402 may compare the code sequence received at 1604 with the reference code sequence retrieved at 1606. As a result of the comparing step at block 1608, the security electronic module 1402 may generate a comparison score; the comparison score may indicate the relative likelihood that the two code sequences were generated by the same person.

A decision block 1612 may follow block 1610. At the decision block 1612, the security electronic module 1402 may determine whether the comparison score generated at 1610 is satisfactory (e.g., above a threshold score value). If so, then block 1614 may follow decision block 1612. At block 1614, the security electronic module 1402 may deem the user 110 to be authenticated and may grant access to the user 110; i.e., the security electronic module 1402 may unlock the door or gate.

The above description of FIGS. 14-16 is just one example of numerous ways in which wearables reading Nano-codes may be employed for authenticating individuals. For a population equipped with Nano-code reading wearables, generally moving around an environment 100 as shown in FIG. 1, it would almost certainly be the case that the wearables could generate—for each individual—a unique time-stamped sequence of detected Nano-codes, extending over days, months or years. This Nano-code based record of movement through the environment 100 could operate as personal identifying data that may be very difficult to counterfeit.

Turning to another example, which may be something of a variation on the example of FIGS. 3, 12 and 13, it may be contemplated to apply Nano-codes to all foodstuffs. In addition to or instead of simply identifying the foodstuff, the Nano-code attached thereto may contain nutrition information regarding the foodstuff. In some embodiments, even beverages may have edible Nano-codes suspended therein. As the user's wearable device tracks—via Nano-codes—what the user eats and drinks, a nutrition history may be developed for the user.

Some wearables may have safety applications, such as wearables that include a backward-looking lens/camera to appraise a bicyclist of hazards that are approaching from behind. For such purposes, for example, the wearable may communicate audibly to the user via a wireless earpiece also worn by the user.

In some embodiments, the wearable computing device 112 may also feature one or more lamps/LEDs to illuminate Nano-codes within the camera field of view at night or when ambient light is insufficient to permit reading of the Nano-codes.

In some embodiments, Nano-code data stored by and/or transmitted by the wearable computing device 112 may be encrypted to promote data security.

In addition to being suspended in liquids, in some applications Nano-codes may also be entrained in gases.

A wearable computing device as described herein may provide the user with an alternative manner of identifying objects visible to the user besides the user's own visual faculty. Moreover, a wearable computing device may operate to communicate to another person what objects or other matter the wearer is seeing or is exposed to. In short, the wearer is enabled to communicate, identify or otherwise use data concerning what the wearer is looking at. Nano-code data read by wearables in accordance with this disclosure may be transmitted to remote systems for processing.

In some embodiments, the wearable computing device may read Nano-codes within visual range many times per second, but then may cancel duplicate readings before permanent or semi-permanent storage, or before transmission to another device.

The camera portion of the wearable computing device may operate in (human) visible and/or non-visible wavelengths of radiation.

As used herein and in the appended claims, the term "processor" should be understood to encompass a single processor or two or more processors in communication with each other.

As used herein and in the appended claims, the term "memory" should be understood to encompass a single memory or storage device or two or more memories or storage devices.

The above descriptions and illustrations of processes herein should not be considered to imply a fixed order for performing the process steps. Rather, the process steps may be performed in any order that is practicable, including simultaneous performance of at least some steps and/or omission of at least some steps.

As used herein and in the appended claims, the term "payment card system account" includes a credit card account, a deposit account that the account holder may access using a debit card, a prepaid card account, or any other type of account from which payment transactions may be consummated. The terms "payment card system account" and "payment card account" and "payment account" are used interchangeably herein. The term "payment card account number" includes a number that identifies a payment card system account or a number carried by a payment card, or a number that is used to route a transaction in a payment system that handles debit card and/or credit card transactions. The term "payment card" includes a credit card, debit card, prepaid card, or other type of payment instrument, whether an actual physical card or virtual.

As used herein and in the appended claims, the term "payment system" refers to a system for handling purchase transactions and related transactions. An example of such a system is the one operated by Mastercard International Incorporated, the assignee of the present disclosure. In some embodiments, the term "payment system" may be limited to systems in which member financial institutions issue payment accounts to individuals, businesses and/or other organizations.

Although the present disclosure has been described in connection with specific example embodiments, it should be understood that various changes, substitutions, and alterations apparent to those skilled in the art can be made to the disclosed embodiments without departing from the spirit and scope of the disclosure as set forth in the appended claims.

What is claimed is:

1. A wearable computing device, the device comprising:
   a wearable device body;
   a magnifying lens for providing magnified images of codes applied to product items, said magnifying lens supported on said wearable device body;
   a digital camera positioned relative to the magnifying lens for capturing the magnified images of codes, said digital camera supported on said wearable device body;
   a processor in communication with the digital camera for reading said codes obtained within a store location; said processor supported on said wearable device body;
   a memory device in communication with the processor, the memory device storing program instructions for controlling the processor, said memory device storing payment information, said memory device supported on said wearable device body; and
   a wireless communication module in communication with the processor, said wireless communication device supported on said wearable device body;
   the processor operative with the program instructions to perform functions comprising:
      detecting that a user who is wearing the wearable computing device has collected ones of said product items;
      obtaining a magnified image of an exit code for the store location; and
      at least partially responsive to determining that a user having the wearable device has exited the store location, based at least partially on processing of the magnified image of the exit code, controlling the wireless communication device to transmit, to merchant checkout equipment, data and/or information comprising:
         (a) product identification data contained in codes that were applied to said collected ones of the product items, said codes having been magnified by the magnifying lens and captured by the digital camera; and
         (b) said payment information stored in the memory device, said payment information for charging the collected items to a payment account owned by the user, said payment information indicative of said payment account.

2. The device of claim 1, wherein the codes as applied to the product items have a size in the range of 100 microns to one millimeter.

3. The device of claim 1, wherein the wearable device body includes an eyeglass frame.

4. The device of claim 1, wherein the wearable device body includes a headband.

5. The device of claim 1, wherein the wearable device body includes a baseball cap.

6. The device of claim 1, wherein the wearable device body includes a wristband.

7. The device of claim 1, wherein the codes are two-dimensional barcodes.

8. The device of claim 1, wherein the codes are one-dimensional barcodes.

9. The device of claim 1, wherein:
the magnifying lens is a first magnifying lens; and
the digital camera is a first digital camera;
the device having a plurality of magnifying lenses supported on said wearable device body, the plurality of magnifying lenses including said first magnifying lens;
the device having a plurality of digital cameras supported on the wearable device body, the plurality of digital cameras including the first digital camera;
each of the magnifying lenses associated with a respective one of the digital cameras;
each of the digital cameras in communication with the processor.

10. The device of claim 9, wherein the digital cameras collectively provide a substantially 360° field of visual input to the processor.

\* \* \* \* \*